July 24, 1962 N. J. WARD 3,046,039
POSTING REGISTER
Filed Nov. 17, 1959 2 Sheets-Sheet 1

INVENTOR
Nephi J. Ward
BY Karl W. Flocks
ATTORNEY

INVENTOR
Nephi J. Ward
BY Karl W. Flocks
ATTORNEY

United States Patent Office 3,046,039
Patented July 24, 1962

3,046,039
POSTING REGISTER
Nephi J. Ward, 5901 Frament Ave., Norfolk, Va.
Filed Nov. 17, 1959, Ser. No. 853,481
12 Claims. (Cl. 282—3)

The present invention relates to a posting register, and more particularly to a charge sales automatic posting register for ledger cards and sales slips.

Where sales are made by one organization to a number of customers, and there are a large number of individual sales to each of the customers, there occurs much work for the accounting department. For example, many gasoline filling stations have a number of customers, each of which owns a plurality of vehicles. These vehicles are brought to the filling station at various times and in random order, and it has been the practice to issue a sales slip as a record of the purchases made for the benefit of an individual vehicle by the driver thereof. These individual sales slips are transmitted to the accounting department, where they are sorted for each of the customers, and the information from the sales slips for a particular customer is posted on an individual ledger card kept for that customer.

It will be understood that as many ledger cards are provided as there are charge customers, and the sales slips from the transactions involving the customer's vehicles are used as the basis for posting onto the ledger card.

It is desirable that the amount of labor that goes into the posting of the ledger cards be reduced as far as possible, in order to save on overhead costs.

It is a general object of the present invention to provide a posting register that may be utilized in such situations as discussed above to provide for the automatic posting of a ledger card at the same time that a sales slip is filled out.

Another object of the present invention is the provision of a posting register that will insure that the automatic posting onto the ledger card will be made in proper sequential order.

Other objects and the nature and advantages of the instant invention will be apparent from the following description taken in conjunction with the accompanying drawings, wherein.

Figure 1:
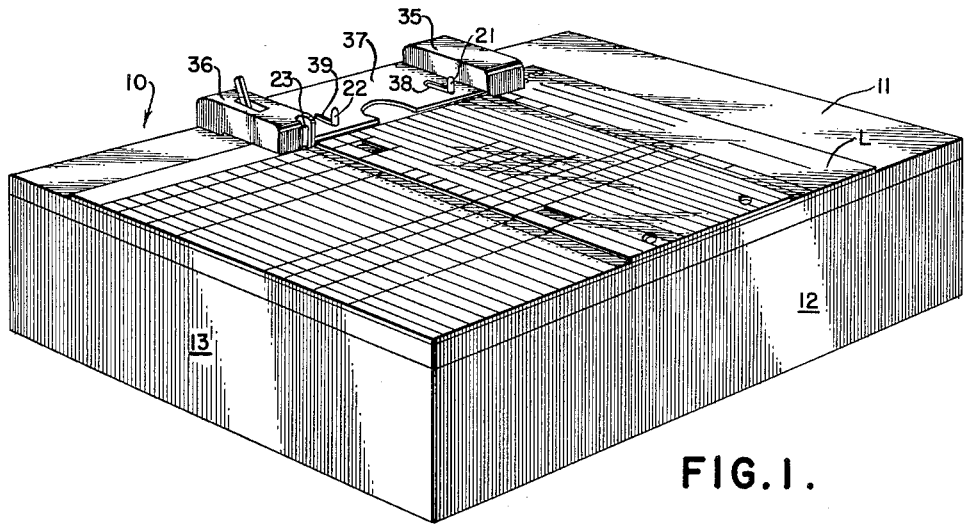
FIG. 1 is a perspective view of a posting register in accordance with the present invention showing a sales slip and ledger card in place.
Figure 3:
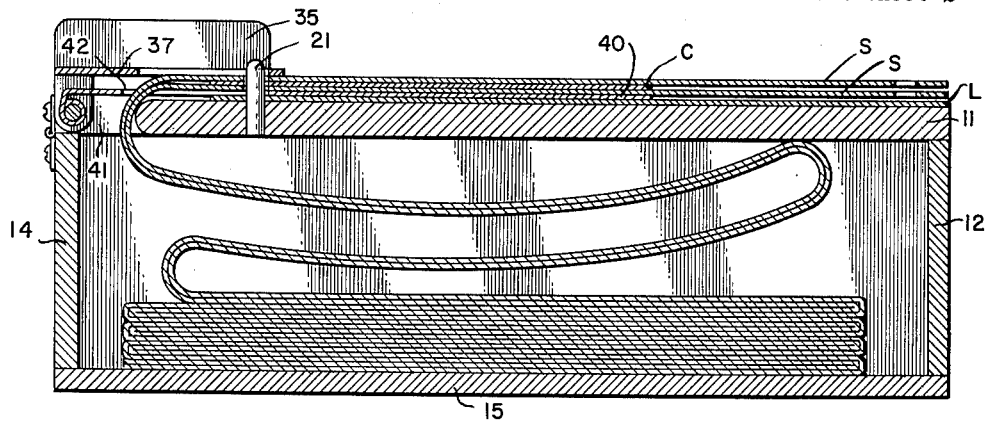
FIG. 3 is an enlarged cross-sectional view taken on the line 3—3 of FIG. 2.

Referring now to the drawings, wherein like reference characters are used to designate like or corresponding parts throughout the several views, there is shown in FIG. 1 a posting register 10 having a planar base 11, a side wall 12 and an end wall 13. Opposite side wall 12, as shown in FIG. 3, there is a hinged door 14, and beneath the base 11 and spaced therefrom is a shelf 15. It may thus be seen that the posting register 10 comprises a generally box-like structure in its preferred embodiment.

Figure 5:
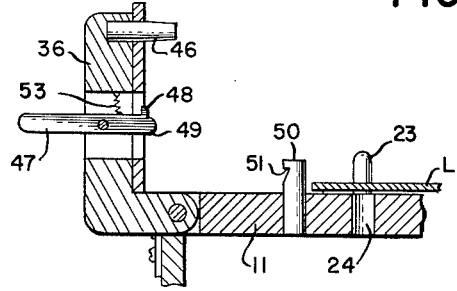
FIG. 5 is an enlarged fragmentary cross-sectional view taken on the line 5—5 of FIG. 2 and showing the register in open position.

Rising upwardly from the base 11 are a first guide post 21 and a second guide post 22. These guide posts are equally spaced from the side margin of base 11 that is opposite side wall 12. A third post 23 may be seen extending upwardly from the base 11 in alignment with the posts 21 and 22 and spaced somewhat below post 22. In FIG. 5 there may be seen a die hole 24. Die hole 24 is in alignment with the three guide posts 21, 22 and 23 and is immediately adjacent the third post 23.

Figure 2:
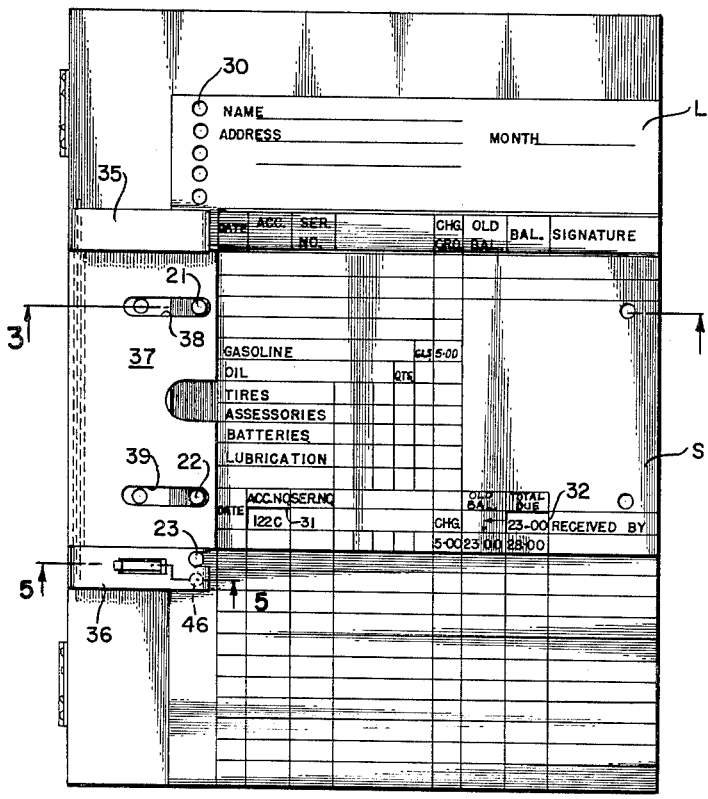
FIG. 2 is a plan view of the posting register of FIG. 1.

Referring now to FIGS. 1 and 2, there may be seen on the base 11 a ledger card generally designated "L," this ledger card being characterized by having a space at the top for the name and address of the customer, together with a space to enter the month or other period for which the ledger card is to be used. There are also provided suitable markings on the ledger card to provide spaces for the date of the sale, the account number of the customer, reference numbers, charge amount, old balance and new balance, as well as signature. Ledger card "L" has horizontal lines for the entry of separate transactions, and is also characterized by having a series of holes 30 adjacent the left margin thereof, one hole 30 opposite each line. The holes 30 extend only part way down from the top thereof when the ledger card "L" is initially put into use.

A sales slip "S" is shown in FIGS. 1 and 2, sales slip "S" having space to enter the various categories of purchases that may be made together with a pair of holes 31 and 32. Hole 31 is beneath a heading "Account No." which lines up with the account number heading on the ledger card "L." Hole 32 is beneath a heading marked "Total Due" and is in line with the balance column of the ledger card "L." Thus the last balance for that account, appearing on ledger card "L," may be read through the hole 32 in sales slip "S" and transferred to a space under the heading "Old Balance," and a new balance entered in the space beneath the hole 32.

A pair of blocks 35 and 36 are pivotally secured to the base 11 adjacent the margin opposite side wall 12, and these blocks 35 and 36 carry a guide plate 37 between them. Guide plate 37 has a pair of spaced holes or slots 38 and 39 therein which are in registry with the first post 21 and the second post 22, respectively. As may be seen from FIG. 4, a separator plate 40 is pivotally secured to the base 11 adjacent the side margin thereof opposite side wall 12, and adjacent door 14, this separator plate extending across the base 11 and having suitable apertures therein which are in registry with the first and second posts 21 and 22. Separator plate 40 has the bottom margin thereof just below post 22 and, as may be seen from FIG. 3, is vertically spaced beneath the guide plate 37. The free end margin of the plate 40, see FIGS. 3 and 4, terminates inwardly of the vertical wall 12 to facilitate entries on the ledger card as will subsequently be described in detail relative to the operation of the posting register. It is between the guide plate 37 and separator plate 40 that the sales slip "S" is fed. Sales slip "S" is preferably provided in a zig-zag stack, as shown in FIG. 3, and is fed from the box-like structure beneath base 11 through a suitable aperture 41 in base 11 and a corresponding aperture 42 in separator plate 40.

The ledger card "L" may be seen in FIG. 2 to be placed on the base 11 with the posts 21, 22 and 23 extending through holes 30. The two sales slips "S," separated by a carbon "C," are fed from beneath the base 11 through the aperture 42 in separator plate 40 and thence over separator plate 40 when the separator plate 40 and guide plate 37 are in the positons shown in FIG. 4. The separator plate 40 and guide plate 37 may then be rotated to the position shown in FIG. 3, at which time the posts 21, 22 and 23 extend through appropriate holes in the ledger card "L," and posts 21 and 22 will enter into appropriate holes in the duplicate sales slips "S."

Figure 6:
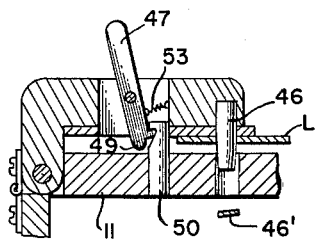
FIG. 6 is a cross-sectional view similar to FIG. 5 and showing the register in closed position.

In order to position the ledger card "L" in proper registry each time that it is placed upon the posting register 10, the lowest of the holes 30 therein is placed over the post 23. When the blocks 35 and 36 and the guide plate 37 are rotated, a new hole 30 is punched in the ledger card "L," the new hole 30 being in alignment with one line of ledger card "L," and the hole immediately above it through which post 23 extends is in alignment with the line immediately thereabove. To effect the punching operation, the block 36, as shown in FIG. 5, is provided with a punch 46. Punch 46 extends from the underside of block 36 and is in registry with die hole 24. Thus, when the block 36 is rotated, the ledger card "L," shown in FIGS. 5 and 6, will have a disk 46' punched therefrom as shown in FIG. 6.

Block 36 is also provided with a latching lever 47, which lever 47 has a latching nose 48 and a shoe 49. A latching post 50 having a notch 51 therein extends upwardly from the base 11 adjacent die hole 24, and when the parts are rotated from the open position shown in FIG. 5 to the closed position shown in FIG. 6, a spring 53 will yield to permit the latching lever 47 to be deflected and then will rotate latching lever 47 so that the nose 48 thereof engages with the notch 51 of latching post 50. Upon rotation of latching lever 47 in the clockwise direction shown in FIG. 6, the shoe 49 thereof will engage with the upper surface of base 11, so that the same motion will unlatch the block 36 and will also raise it slightly.

Figure 4:
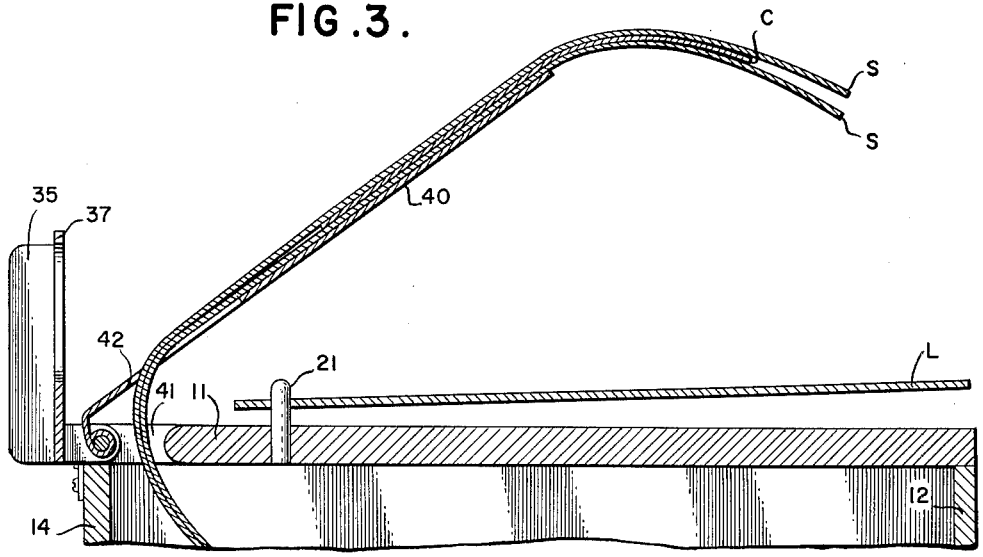
FIG. 4 is a cross-sectional view similar to FIG. 3, but showing the register in open position.

To use the posting register 10, it is placed in the open position shown in FIG. 4, with a supply of zig-zag folded duplicate sales slips "S" resting on the shelf 15, the first duplicate sales slip is threaded through the aperature 41 in base 11 and the aperture 42 in separator plate 40 so as to overlie the latter. A ledger card "L" of the customer whose vehicle is being serviced will be withdrawn from a storage place and placed upon the base 11. In particular, the lowest of the holes 30 will be placed upon the post 23 and the other holes 30 will be placed over the posts 21 and 22. The separator plate 40 will then be rotated so as to overlie the ledger card "L" and then the blocks 35 and 36 and the guide plate 37 will be rotated to also overlie the base 11.

The latching lever 37 will engage with the latching post 50 to hold the parts in the desired relationship and simultaneously the punch 46 will enter into the die hole 24 to punch a new hole 30 in ledger card "L"; the new hole 30 is in alignment with the next lower line of ledger card "L" beneath the line which is opposite the hole through which post 23 extends.

With the parts in position as thus specified and referring to FIG. 2, the employee of the filling station need perform only a few simple operations. Thus, he will enter the date on the lower left-hand side of the sales slip "S" and this date will be transferred through the carbon paper "C" onto the duplicate sales slip by carbon on the bottom of the duplicate sales slip "S" onto the ledger card "L." To insure posting onto the proper ledger card and for verification of records, the account number, which is visible through hole 31 in sales slip "S," is copied in the space immediately beneath the hole 31, the writing being done on sales slip "S" and being transferred to ledger card "L" by carbon on the duplicate sales slip "S." The charge of $5.00, in the illustrated example, is entered in the charge column, opposite the item "gasoline," but because of the absence of carbon from the corresponding part on the back of the duplicate sales slip "S," there will be no transfer of this amount onto the ledgercard "L." The total charge of $5.00 is entered in the appropriate space at the bottom of sales slip "S," and the former balance of $23.00 is observed through hole 32, this being on ledger card "L." The old balance of $23.00 is then entered next to the total charge of $5.00 and the addition made, the total balance for the particular customer being $28.00. The old balance of $23.00 and the new balance of $28.00 are both transferred to ledger card "L" by means of the carbon on the underside of the duplicate sales slip "S." The register 10 may then be handed to the driver of the customer's vehicle, who will sign or initial in the space below the words "Received By," and this writing also will be transferred to ledger card "L" by the carbon on the underside of the duplicate sales slip "S."

The original of the sales slip "S" is given the vehicle driver, and the ledger card "L" and copy of the sales slip "S" are retained, the ledger card "L" being returned to its proper storage place.

There has been provided an automatic posting register which will enable a ledger card to be properly posted as an adjunct to and simultaneously with the filling out of a sale slip. The ledger card will be placed in proper position each time it is used, and a new guide hole punched, thus preparing the ledger card for the next usage thereof.

It will be obvious to those skilled in the art that various changes may be made without departing from the spirit of the invention and therefore the invention is not limited to what is shown in the drawings and described in the specification but only as indicated in the appended claims.

What is claimed is:

1. In combination, a posting register comprising a planar base, first and second co-linear posts extending vertically from said base, a third post extending vertically from said base in spaced co-linear relationship with said first and second posts, a die hole in said base in co-linear alignment with said posts and spaced from and immediately below said third post, a separator plate including spaced co-linear apertures removably received on said first and second posts, said separator plate extending transversely of said base in juxtaposed relation thereon, and displaceable support means on said base adjacent said posts, said support means including an aperture receivable on said third post, said support means including a depending punch registrable with said die hole for perforating a ledger card disposed therebeneath in spaced relation from said separator plate, said separator plate including intermediate aperture portions to permit only selected ledger card data to be observed therethrough, said separator plate including a marginal edge portion terminating intermediately of said base plate for permitting portions of a sales slip and ledger card to be in immediate juxtaposed relation to facilitate the inscribing of common data thereon.

2. The combination as set forth in claim 1; said support means comprising a guide plate extending between said first and second posts and vertically spaced above the upper surface of said support plate for permitting an endless series of sales slips to be moved between said separator plate and guide plate and positioned in oriented relationship on the upper surface of said base.

3. The combination of claim 2; said displaceable support means including a latch assembly thereon detachably engageable on said base for retaining said separator and guide plates in a relatively fixed position with respect to said base.

4. The combination as set forth in claim 3; said latch assembly comprising a lever element pivotally mounted on said displaceable support means, and a latch post on said base engageable with said pivotal lever for lockingly engaging the same.

5. In combination, a posting register for simultaneous use with a sales slip and ledger card comprising a base, vertically disposed orienting means on said base adjacent one edge thereof for receiving a perforated ledger card thereon, separator plate means positionable in juxtaposed relation on said base for overlying said ledger card, said separator plate means including portions thereon for permitting selected indicia on said card to be observed through said plate, said orienting means including portions extending above said separator plate means for orienting a perforated sales slip in juxtaposed relation on said separator plate, portions of said separator plate means comprising masking portions for permitting simultaneous inscription of certain data on only the sales slip and common data on both the sales slip and ledger card, and punch means on said base and including a punch portion extendable through said base for perforating said ledger card in a predetermined position with previously formed perforations to permit subsequent reorientation of the ledger card with respect to said separator plate to permit portions of said common data to be exposed during the next entries on said ledger card and a new sales slip.

6. The structure of claim 5; said separator plate including side margins for overlying intermediate portions of a ledger card to permit selected indicia thereof to be exposed, said punch means being spaced from a lower margin portion of said separator plate means, said separator plate including an end margin terminating intermediately of said base for permitting juxtaposed portions of said sales slip and ledger card to be juxtaposed and have some common data inscribed thereon.

7. The structure of claim 5; said separator plate being pivotally mounted on said base on an axis of rotation parallel to said one edge, said separator plate means having a width less than that of said base for conforming to the width of a sales slip, said separator plate means terminating at one end intermediately of said base for permitting unseparated portions of a sales slip and ledger card to be juxtaposed.

8. The structure of claim 7; and guide plate means pivotally mounted on an axis of rotation parallel to said one edge and juxtapositionable on said separator plate for receiving a sales slip therebeneath, said punch means being mounted on said guide plate whereby said punch portion will extend through said base when the guide plate overlies said separator plate.

9. The structure of claim 8; said separator and guide plates including alignable aperture portions for receiving said orienting means therein.

10. The structure of claim 8; said guide plate and base including manually releasable latch means for retaining said guide plate in juxtaposition over said separator plate means for retaining the sales slip and ledger card in a relatively fixed position on said base when entries are made thereon.

11. The structure of claim 10; said latch means including a release portion engageable with said base for urging said guide plate means away from said base for facilitating removal of said sales slips from the posting register.

12. The structure of claim 7; said base including an elongated slot portion parallel to said axis of rotation for receiving a continuous web of sales slips therethrough.

References Cited in the file of this patent
UNITED STATES PATENTS

| | | |
|---|---|---|
| 2,344,453 | Payne | Mar. 14, 1944 |
| 2,435,684 | Jones | Feb. 10, 1948 |
| 2,836,433 | Dolan | May 27, 1958 |

FOREIGN PATENTS

| | | |
|---|---|---|
| 214,987 | Great Britain | July 17, 1925 |
| 106,116 | Austria | Apr. 11, 1927 |